United States Patent
Martí Sendra et al.

(10) Patent No.: US 9,048,939 B2
(45) Date of Patent: Jun. 2, 2015

(54) PHOTONIC CELL CONTROL DEVICE AND METHOD FOR ULTRA-WIDEBAND (UWB)TRANSMITTERS/RECEIVERS

(75) Inventors: Javier Martí Sendra, Barcelona (ES); Roberto Llórente Saez, Valencia (ES)

(73) Assignee: UNIVERSIDAD POLITECNICA DE VALENCIA (ES)

(*) Notice: Subject to any disclaimer, the term of this patent is extended or adjusted under 35 U.S.C. 154(b) by 1363 days.

(21) Appl. No.: 12/812,340

(22) PCT Filed: Dec. 10, 2008

(86) PCT No.: PCT/ES2008/000772
§ 371 (c)(1),
(2), (4) Date: Nov. 16, 2010

(87) PCT Pub. No.: WO2009/074701
PCT Pub. Date: Jun. 18, 2009

(65) Prior Publication Data
US 2011/0051788 A1 Mar. 3, 2011

(30) Foreign Application Priority Data

Dec. 11, 2007 (ES) .................................. 200703431

(51) Int. Cl.
*H04B 10/00* (2013.01)
*H04B 1/7163* (2011.01)
(Continued)

(52) U.S. Cl.
CPC .............. *H04B 1/7163* (2013.01); *H04B 1/719* (2013.01); *H04W 88/085* (2013.01)

(58) Field of Classification Search
CPC .............. H04B 10/25; H04B 10/2575; H04B 10/25753; H04B 10/25759; H04W 88/06; H04W 4/00; H04W 84/18

USPC ........... 398/115, 116, 117, 66, 67, 68, 69, 70, 398/71, 72, 76, 79, 135, 136, 138, 139, 25, 398/26, 27, 33, 38, 113; 370/328, 329, 338, 370/401, 389, 352, 392; 455/561, 522, 455/422.1, 445, 509
See application file for complete search history.

(56) References Cited

U.S. PATENT DOCUMENTS 7,349,633 B2 * 3/2008 Lee et al. ...................... 398/115
7,366,150 B2 * 4/2008 Lee et al. ...................... 370/338
(Continued)

FOREIGN PATENT DOCUMENTS

| EP | 1747616 | 1/2007 |
|---|---|---|
| GB | 2399475 | 9/2004 |
| WO | WO 03/084259 | 10/2003 |

OTHER PUBLICATIONS

International Search Report dated Jun. 9, 2009, issued in corresponding international application No. PCT/ES2008/000772.
(Continued)

Primary Examiner — Hanh Phan
(74) Attorney, Agent, or Firm — Ostrolenk Faber LLP

(57) ABSTRACT

The present disclosure relates to a cell organization and method for controlling ultra-wideband (UWB) transmitting/receiving devices, the aim of which is to improve spatial occupancy (number of transmitters/receivers operating per unit area) and spectral efficiency (number of transmitters/receivers operating in a certain frequency range) in a predetermined area. The control method is based on configuring the optimum parameters—transmission power, bandwidth among others—for each UWB transmitter/receiver present in each cell. The configuration is calculated by monitoring the spectral parameters of the UWB transmitters/receivers operating in the area under control using a series of UWB sensors. In a preferred embodiment of the disclosure the sensors can be interconnected using photonic technology.

8 Claims, 3 Drawing Sheets

(51) Int. Cl.
*H04B 1/719* (2011.01)
*H04W 88/08* (2009.01)

(56) References Cited

U.S. PATENT DOCUMENTS

| | | | |
|---|---|---|---|
| 2005/0025487 A1* | 2/2005 | Kwon et al. | 398/83 |
| 2005/0255878 A1 | 11/2005 | Leinonen et al. | |
| 2007/0054682 A1* | 3/2007 | Fanning et al. | 455/509 |
| 2007/0093237 A1 | 4/2007 | Bayne | |
| 2007/0172241 A1* | 7/2007 | Kwon et al. | 398/115 |

OTHER PUBLICATIONS

Xu et al., "Energy Efficient Medium Access Control for Ultra Wide Band Cluster-based Sensor Network", Vehicular Electronics and Safety, IEEE International Conference Dec. 13-15, 2006, pp. 236-240.

Guvenc et al., "Adaptation of Multiple Access Parameters in Time Hopping UWB Cluster Based Wireless Sensor Networks", 2004 IEEE International Conference on Mobile Ad-hoc and Sensor Systems, pp. 235-244.

Lin et al., "Generation of Ultrawideband Pulses using a Distributed Fiber-Link System", ICTON 2007, Mo. P.4., pp. 12-15.

Zeng et al., "An Approach to Ultrawideband Pulse Generation and Distribution Over Optical Fiber", IEEE Photonics Technology Letters, vol. 18, No. 7, pp. 823-825, 2006.

* cited by examiner

PHOTONIC CELL CONTROL DEVICE AND METHOD FOR ULTRA-WIDEBAND (UWB) TRANSMITTERS/RECEIVERS

CROSS REFERENCE TO RELATED APPLICATIONS

The present application is a 35 U.S.C. §371 National Phase conversion of PCT/ES2008/000772, filed Dec. 10, 2008, which claims benefit of Spanish Application No. 200703431, filed Dec. 11, 2007, the disclosure of which is incorporated herein by reference. The PCT International Application was published in the Spanish language.

OBJECT OF THE INVENTION

The present invention relates to an organisation and method for controlling transmitting/receiving systems using ultra-wideband transmission (systems known by the acronym UWB), operating in a predetermined geographical area, by means of their cellular grouping and coordinated management. The control method is based on monitoring the spectral parameters of the devices operating in the area under control. This monitoring also allows the level of electromagnetic generation generated by the group of managed UWB cells to be evaluated with a view to guaranteeing that the limits established in the regulations to such effect are not exceeded.

BACKGROUND OF THE INVENTION

The present invention comprises three fundamental aspects: in the first place, the organisation of the UWB transmitters/receptors into a group of cells (UWB cells), as a complementary or replacement transmission system for other cell systems such as GSM (Global System for Mobile communications), UMTS (Universal Mobile Telephone System) or equivalents, in the second place, a joint control method for the UWB devices that allows roaming between said UWB cells, and in the third place, the spectral monitoring of the UWB signals present in the radioelectric environment by means of the steps of transmitter identification and spectral analysis of the signal generated by those transmitters.

No system or technique is known that describes a cell organisation of UWB transmitters/receptors with a view to optimising their functioning as a whole. However, various devices and methods are known that use UWB signals in different applications, but these systems and the associated techniques turn out to be deficient with regards to the efficiency of the communication and can be improved by means of the object of this invention.

Published patent application number US2007093237 describes a mechanism for locating cellular devices, which can use UWB technology among others, with a view to transmitting information. This patent thus describes a localisation application that can be applied in UWB technology but that does not use any cellular control or organisation, which involves inefficiency in the communication.

Published patent application number EP1747616 describes a cellular device in GSM or UMTS technology wherein the main functioning lies in that grid in such a way that when the level of the GSM or UMTS signal is low—the system is in an area without coverage—switching of the communication to UWB technology occurs. In this way, UWB connectivity is used as a back-up mechanism, bearing in mind the potential interference of the 2G/3G signal, but without including cellular functionalities, which likewise implies the same limitation in terms of efficiency as the application described in the previous section.

On a separate note, published patent application number WO03084259 describes a UWB communication system designed to monitor the location of people, in particular children, by means of a wrist device. As in the previous case, this patent describes a simple application of the combination of UWB technology together with the GPS (Global Positioning System) satellite technology and one that does not contain its cellular configuration and likewise having the same limitations in the efficiency of the communication.

At the same time, published patent application number GB2399475 describes a mechanism that facilitates the concurrent use of conventional 2G/3G cellular technologies minimising the interferences between the two. This application, likewise, does not describe the possibility of a cellular configuration, meaning that it presents the same limitations with regards to the efficiency of the communication as the patents described in the preceding paragraphs.

It has been considered that it would be convenient to establish a method and device that solves, at least in part, some of the problems or inconveniences presented by the known systems.

DESCRIPTION OF THE INVENTION

The present invention consists of a method and device capable of improving the spatial efficiency (defined as the number of UWB transmitters/receptors in simultaneous operation per surface unit) and spectral efficiency (defined as the number of UWB transmitters/receptors in simultaneous operation within the same frequency range) in a predetermined area. This method is referred to as "cellular control of UWB devices".

The signal transmitted by the UWB devices presents differential characteristics in respect of other wireless communication systems: the bandwidth of the UWB signal is equal to or greater than 500 MHz, or its fractional bandwidth is greater than 25% according to the description contained in the "FCC First Report and Order" of 14 Feb. 2002.

The spatial and spectral optimisation is achieved by means of adjusting different parameters of each UWB transmitter/receptor within an area under control. These parameters may be radiated power, the range of operating frequencies, the allocated channel or channels (alternatively, the central operating frequency may be allocated) among others.

The proposed control method is based, without loss of generality, on monitoring the radioelectric spectrum of the UWB transmitters in operation within the area under control, calculating the optimum parameters for each one of them and subsequently configuring them. The configuration may be carried out, without loss of generality, by means of wireless communication using any protocol considered appropriate.

In a particular manner, the spectral monitoring can be carried out using analogue-digital converters based on photonic technology. These converters offer the advantage of being able to capture the entire spectrum of a UWB signal simultaneously, in other words, avoiding the stages of filtering, sweeping and conversion to an intermediate frequency.

In summary, the method described comprises a cell organisation of a set of UWB transmitters/receptors in a predetermined area and the control of their operating parameters. The control is based on monitoring the spectrum radiated by each UWB transmitter, which allows the overall level of electromagnetic radiation generated by the group of UWB cells to be evaluated with a view to guaranteeing that the limits established in the regulations are not exceeded. This presents notable benefits of efficiency in the communication.

The present invention finds its application in the efficient provision of wireless communication services using UWB technology.

BRIEF DESCRIPTION OF THE DRAWINGS

These and other characteristics and advantages of the invention will be described more clearly in the detailed description that follows of a preferred mode of embodiment, provided only by way of illustration and not limitation, with reference to the attached drawings, wherein.

DESCRIPTION OF THE PREFERRED EMBODIMENT

Figure 1:
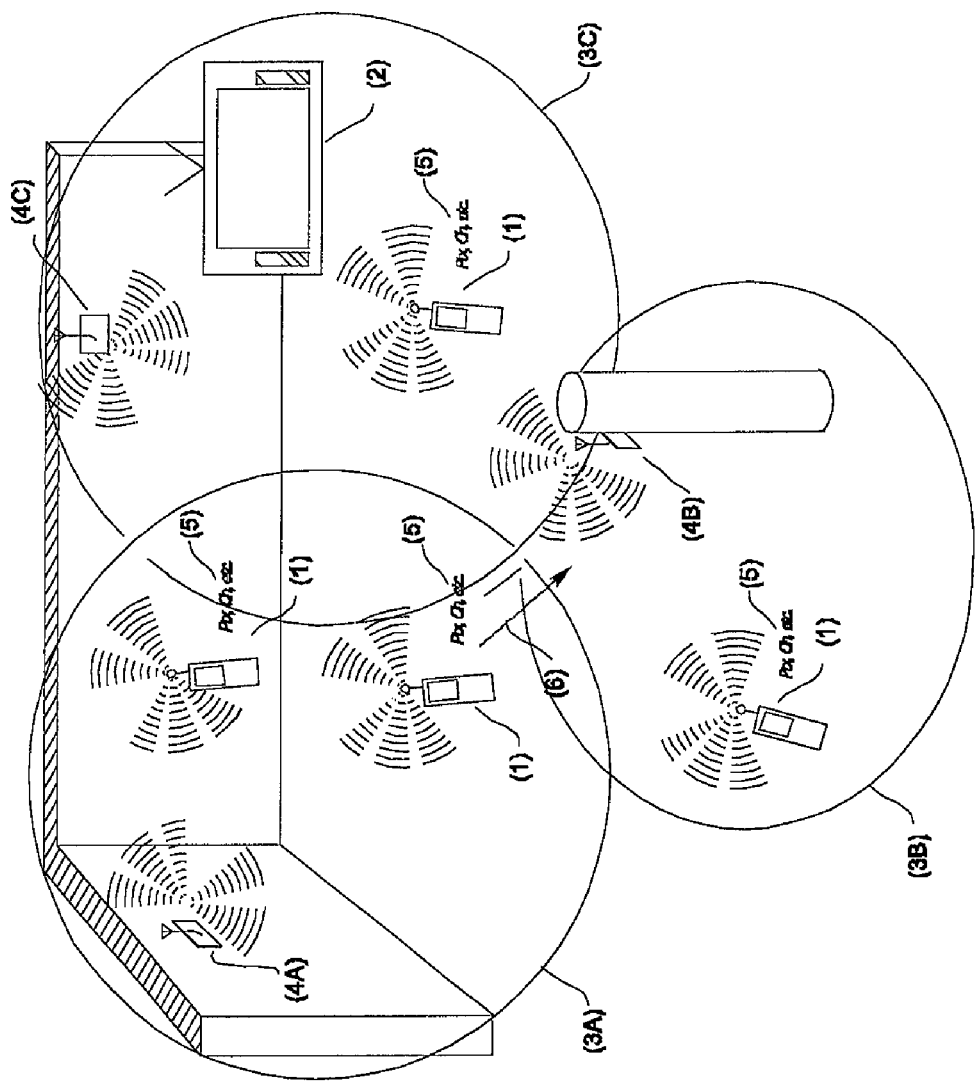
FIG. 1 shows the field of application of the UWB cellular control method and device. This figure shows different UWB transmitters/receptors operating within the area of cover of a control node.

In order to carry out the following detailed description of the preferred embodiment of the present invention, permanent reference will be made to the Figures of the drawings, throughout which the same numerical references have been adopted for equal or similar parts. Thus, referring, in the first place, to FIG. 1, the drawing shows the field of application of the method and device of cellular control of UWB transmitters/receptors. This diagram shows different UWB transmitters/receptors (1), or UWB receptors (2) only. These devices are operating within an area made up of the joint individual coverage of a number of cells (3A) (3B) (3C) wherein UWB communications are established. Each cell can comprise a control node (4A) (4B) (4C) which facilitates communication between the UWB transmitters/receptors. Each UWB transmitter has allocated operating parameters (5) that can include the transmission power, the channel to use, among other characteristics and that can be assigned by the control node by means of a wireless communication. The UWB transmitters/receptors can move between different areas of coverage carrying out what is known as roaming (6). In this case, each time the UWB terminal moves, for example from (3A) to (3B), a new allocation of operating parameters takes place.

Figure 2:
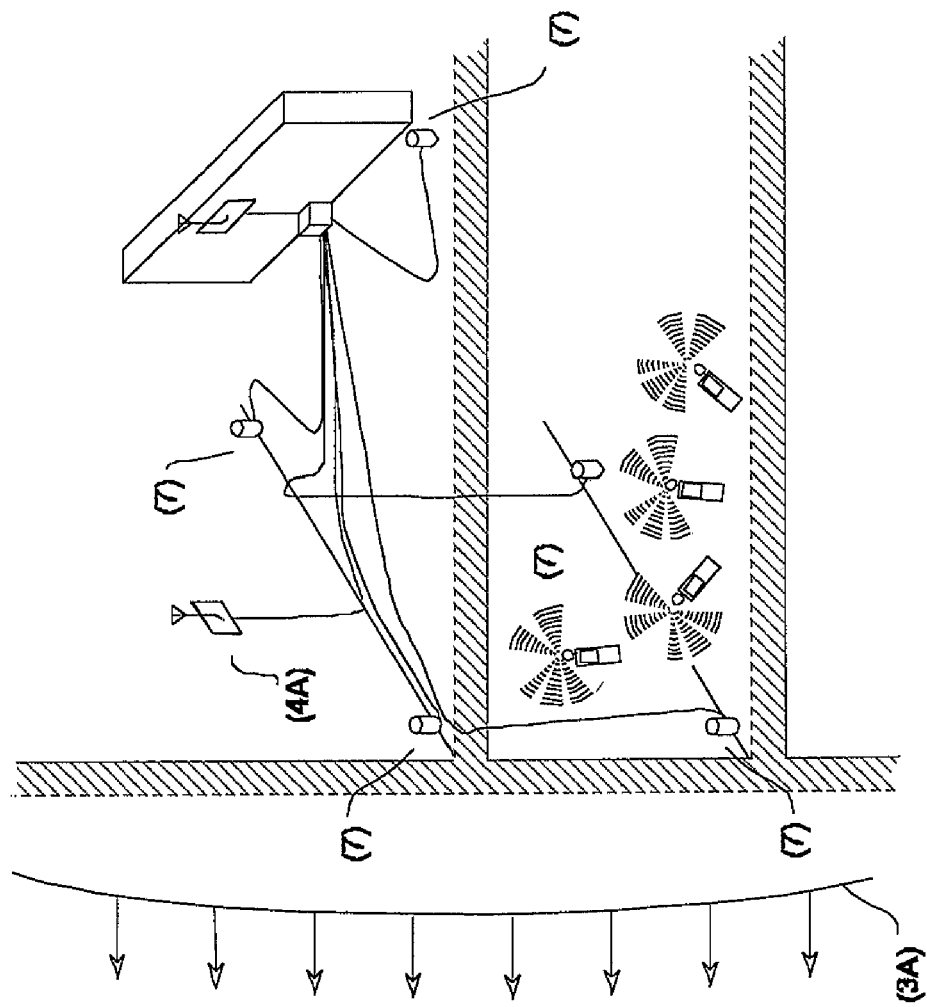
FIG. 2 shows an example of the implementation of the cellular control wherein a central transmitter node sends control information to the UWB transmitters/receptors operating within its area of cover. This information can include the allocation of a channel and/or transmitted power, among other parameters.

FIG. 2 shows an example of the implementation of the UWB cellular control system for a single cell. In this figure it can be seen that the system comprises a central transmitting node (4A) which controls an area of coverage (3A). The control bases information on the spectral and perhaps time content of the radioelectric environment (time-frequency analysis). The spectral information is obtained by means of a series of UWB sensors (7). These sensors capture the spectrum of the UWB signal and allocate the operating frequency and/or transmitted power, among other parameters, to each UWB transmitter within the area of coverage with a view to optimising the spatial density, the spectral occupancy and guarantees the compatibility with other wireless transmission systems that operate within the band of frequencies of the UWB signal. The control information is transmitted to the UWB devices by the transmitter (4A). This information includes the operating parameters for each UWB device, which can include the channel to use, the level of power or the type of modulation, among others.

Figure 3:
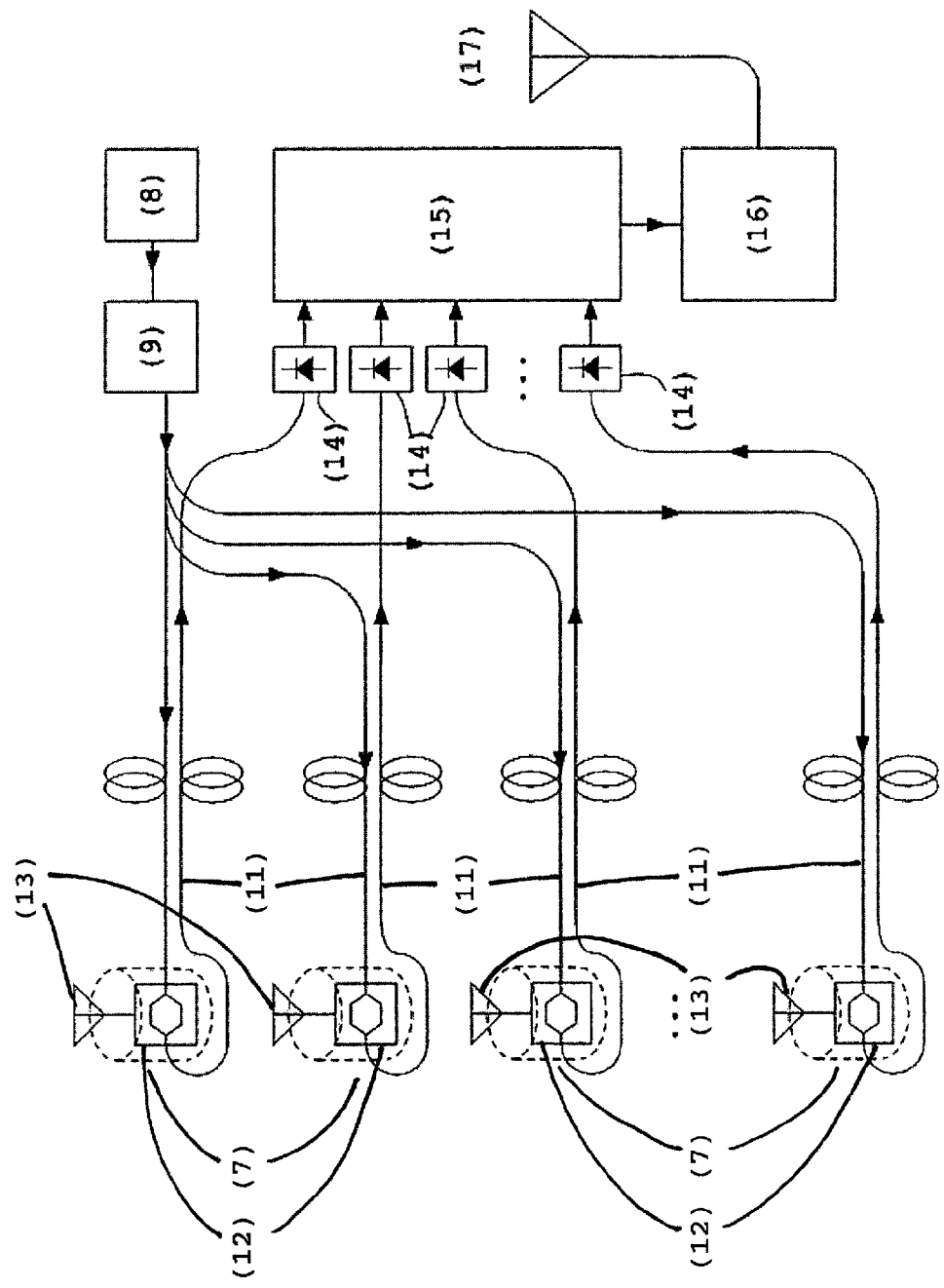
FIG. 3 shows an example of the implementation of the central control node. This node carries out the spectral monitoring of the UWB signal by means of the analysis of the monitored radioelectric spectrum using a series of UWB sensors placed within its area of cover.

FIG. 3 shows an example of the implementation of the central control node in photonic technology. This node carries out the spectral monitoring of the UWB signal by means of a series of UWB sensors. This figure shows, without loss of generality, a particular implementation based on an analogue-digital converter complemented by a fibre optic connection of the different sensors with a central node where the UWB signals are digitalised with a view to carrying out an analysis of the full range of frequencies of the UWB signals.

A possible solution for the simultaneous spectral and time analysis of the UWB signals present within a certain area of coverage, without prejudice to other solutions, is the implementation of the example shown in FIG. 3. This implementation is made up of a supercontinuum (8) type laser source. This laser source generates narrow optical pulses in time but with spectral components in a bandwidth that can reach hundreds of nanometers. The optical pulses generated by a super-continuum laser source can be filtered in frequency (9) with a view to creating a series of channels by division in frequency, which is carried to each UWB sensor (7) by means of a stretch of fibre. In each sensor the UWB radio-frequency signal is modulated on a corresponding optical channel and transmitted in fibre (11) to a central node for cellular control. Each sensor (7) comprises an electro-optical modulator (12) which modulates the UWB signal of radio-frequency, possibly amplified, captured by an antenna (13) on the corresponding optical channel. The modulated UWB signal is transmitted by fibre to a photodetector (14) where it is photodetected, digitalised (15) and processed (16) with a view to evaluating the joint spectral content of the signal captured by the sensors (7).

Based on the spectral content of the UWB signals in the cellular organisation the optimal operating parameters are calculated for each UWB transmitter with a view to optimising the communication capacities and avoiding the generation of signal levels that exceed the regulations applying to UWB technology. These parameters are transmitted to the UWB devices by means of a radiofrequency signal or signals (17).

It is not considered necessary to make the content of this description more extensive for an expert in the art to understand its scope and the advantages resulting from the invention, as well as to develop and embody the object hereof.

Nonetheless, it must be understood that the invention has been described according to a preferred embodiment thereof, meaning that it may be liable to changes without this entailing any alteration of its foundations, defined in the attached claims.

What is claimed is:

1. A photonic cell control system for ultra-wide band transmitters/receptors that comprises:
   a series of ultra-wide band sensors that capture operating parameters;
   a central transmitting node that receives the operating parameters from the series of ultra-wide band sensors;
   at least one ultra-wide band transmitter; and
   at least one ultra-wide band receiver,
   wherein the at least one ultra-wide band transmitter is controlled by the central transmitting node.

2. The photonic cell control system for ultra-wide band transmitters/receptors, according to claim 1, that further comprises:

a series of photodetectors;

an optical source that creates a channel for each ultra-wide band sensor;

a series of optical fibers that connect the channel of each ultra-wide-band sensor to the optical source;

a modulator located on each ultra-wide band sensor that modulates the signal of each optical channel generating a modulated ultra-wide band signal;

a series of optical fibers that connect each sensor to one of the photodetectors wherein the photodetectors detect the modulated ultra-wide band signal; and a digitizer that digitizes the signal detected by the photodetector.

3. The photonic cell control system for ultra-wide band transmitters/receptors, according to claim 2 wherein the optical source is a supercontinuum type laser.

4. The photonic cell control system for ultra-wide band transmitters/receptors, according to claim 1 wherein the series of ultra-wide band sensors further comprise an electro-optical modulator and an antenna.

5. The photonic cell control system for ultra-wide band transmitters/receptors, according to claim 1, wherein the operating parameters include channel to use, transmitter power level, frequency bandwidth, or kind of modulation to be employed.

6. A photonic cell control method for ultra-wide band transmitters/receptors that comprises the steps of:

identifying ultra-wide band devices within a cell by analyzing signals of the series of ultra-wide band sensors;

monitoring the spectrum of ultra-wide band signals transmitted in at least a cell by the series of ultra-wide band sensors;

calculating operating parameters that maximize the spectral efficiency; and transmitting the operating parameters to the at least one ultra-wide band transmitter.

7. The photonic cell control method according to claim 6 that further comprises the step of allocating new operating parameters and transmitting such new operating parameters to ultra-wideband transmitters within a cell when at least one ultra-wideband transmitter moves between cells.

8. The photonic cell control method according to claim 6, wherein the operating parameters calculated and transmitted to the at least one ultra-wideband transmitter are calculated considering the overall level of radiation generated.

* * * * *